United States Patent [19]

Wulff

[11] Patent Number: 4,607,960
[45] Date of Patent: Aug. 26, 1986

[54] PERFORMING CONTACT-FREE MEASUREMENT ON A WORKPIECE

[75] Inventor: Gunther Wulff, Stein am Rhein, Switzerland

[73] Assignee: Swiss Aluminium Ltd., Chippis, Switzerland

[21] Appl. No.: 714,640

[22] Filed: Mar. 21, 1985

[30] Foreign Application Priority Data

Mar. 26, 1984 [CH] Switzerland ............... 1504/84

[51] Int. Cl.$^4$ ............................................. G01K 3/02
[52] U.S. Cl. ................................................. 374/7
[58] Field of Search .............. 374/4, 5, 6, 7, 135, 374/54, 43; 73/37.5

[56] References Cited

U.S. PATENT DOCUMENTS

| 2,598,178 | 5/1952 | Kalle | 73/37.5 |
| 3,566,676 | 3/1971 | Hays | 374/54 X |
| 3,610,024 | 10/1971 | Honjo et al. | 73/37.5 |
| 4,142,401 | 3/1979 | Wilson | 73/37.5 |
| 4,191,052 | 3/1980 | Drzewiecki | 374/135 |
| 4,357,824 | 11/1982 | Foss et al. | 374/54 |
| 4,430,010 | 2/1984 | Zrenner et al. | 374/5 X |

FOREIGN PATENT DOCUMENTS 2132354 4/1984 United Kingdom ............... 73/37.5

Primary Examiner—Daniel M. Yasich
Attorney, Agent, or Firm—Bachman & LaPointe

[57] ABSTRACT

A device for contact-free measurement of the temperature at the surface of a workpiece, in particular aluminum strips and sections, and/or for determining and/or measuring the shape of a workpiece, in particular dimension or shape or the like includes, a measuring pin which has a central bore resides in a housing and is directed at the workpiece. The workpiece is jetted with compressed gas emerging from the central bore. The measuring pin in the housing can be moved in the direction x and maintains a specific distance s from the surface of the workpiece as a result of a negative pressure created by the compressed gas between the base of the measuring pin and the workpiece surface. Situated in the bore and at the base of the measuring pin are thermocouples which transmit their measured values to a registering unit.

6 Claims, 1 Drawing Figure

U.S. Patent     Aug. 26, 1986     4,607,960
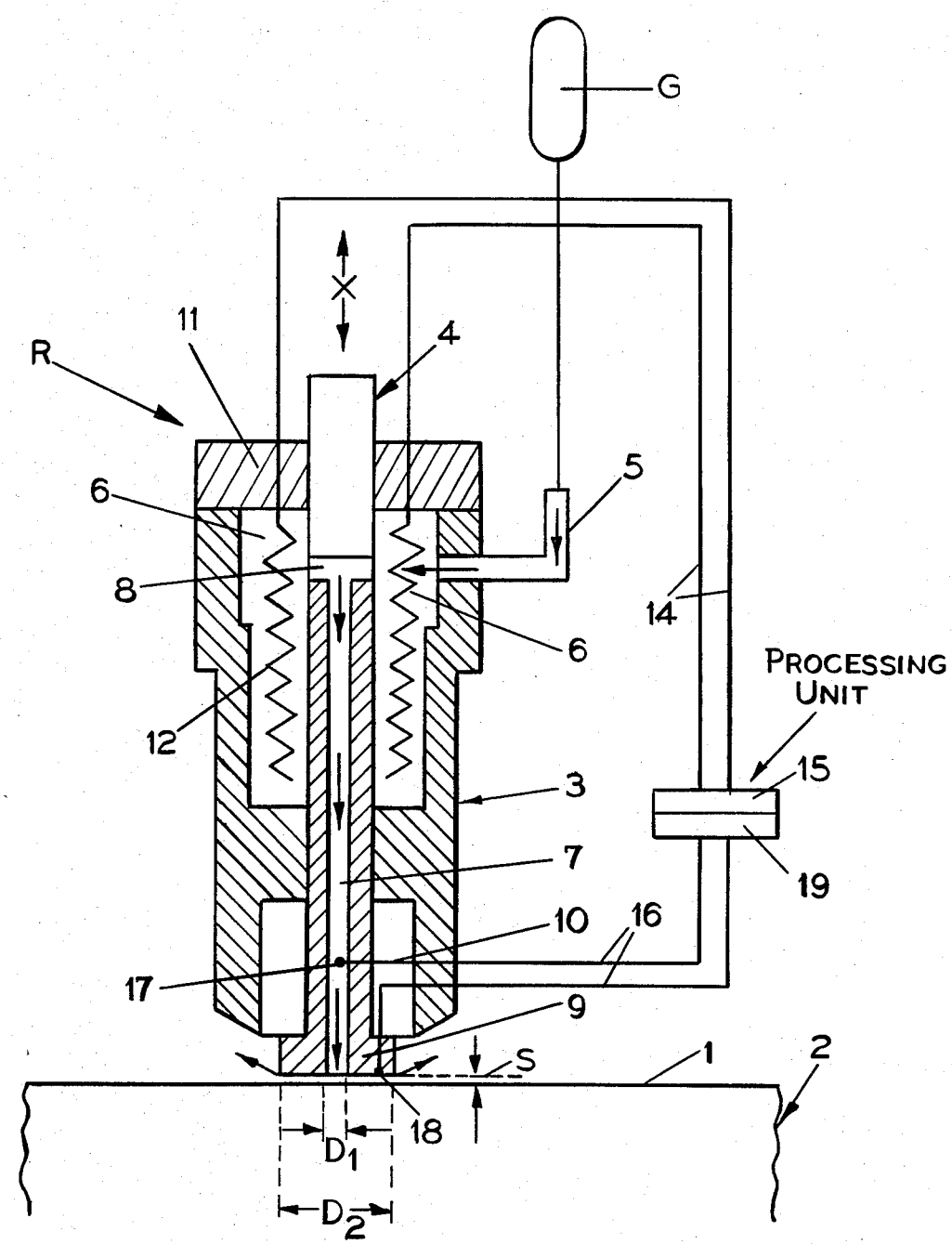

PERFORMING CONTACT-FREE MEASUREMENT ON A WORKPIECE

BACKGROUND OF THE INVENTION

The invention relates to a device and a process for performing contact-free measurement on a workpiece, in particular an aluminum strip or section, using a temperature sensor and at least one rod situated in a fixed housing and directed at the workpiece.

Such a device according to U.S. Pat. Nos. 3 926 053 and 3 961 184 (German publication No. 22 41 108) is employed for contact-free measurement of the speed of movement of the surface of a rotating body featuring contrast marks, in particular the rotor of a gas centrifuge using an optical rod or fibre one end of which faces the contrast marks; in the immediate vicinity of this end of the rod or fibre there are sensors for measuring other parameters of the rotating body.

In awareness of this state of the art the object of the present invention is to simplify the device mentioned at the start, in particular to make the measurement of temperatures at the surface easier.

SUMMARY OF THE INVENTION

The foregoing object is achieved by way of the invention wherein a rod, in the form of a measuring pin, features a central bore which serves as a feed channel for a compressed gas that impinges on the workpiece, is moveable along the direction of the central axis inside a housing, and has a base piece at one end which is maintained at a constant distance from the workpiece surface by a reduced pressure created by the outflowing gas, thermocouples serving as temperature sensors being situated in the central bore and at the base of the pin and connected to a unit for registering the measured data.

It has been found particularly favorable to connect the central bore via a transverse bore in the measuring pin to a ring-shaped chamber in the housing, to which chamber a feed pipe for the compressed gas is connected and in which heating elements are situated; the said heating elements are connected by wires to a control facility at the registering unit. The heating elements are used preferably to raise the temperature of the compressed gas in the ring-shaped chamber to the temperature that prevails at the base of the measuring pin. As this gas in turn attempts to reach the same temperature as the surface of the workpiece, the temperature of the compressed gas extremely quickly reaches the same level as that of the base of the measuring pin and that of the surface of the workpiece.

This measuring device can either serve solely for contact-free measurement of the temperature at the surface of a workpiece or be coupled with the constructive features of the device according to the British Pat. No. 2 132 354, published July 4, 1984, for determining and/or measuring the shape of a workpiece. The result is, advantageously, a measuring instrument which is particularly simple in design, easy to handle, and can fulfil a plurality of functions at the same time.

Also within the scope of the invention is a measuring process for applying to the surface of a workpiece, in particular an aluminum strip or section, using the described measuring device, in which process the compressed gas creates a negative pressure between the measuring pin and the surface of the workpiece and thus maintains the moveable measuring pin at a specific distance from that surface; the temperature in the central bore and at the base of the measuring pin is measured and from that the temperature of the surface.

The compressed gas is preferably maintained at the temperature of the base of the mesuring pin, which corresponds to the temperature at the surface of the workpiece.

BRIEF DESCRIPTION OF THE DRAWINGS

Further advantages, features and details of the invention are revealed in the following description of a preferred exemplified embodiment and with the aid of the single schematic drawing showing a cross-section through a device R according to the invention.

DETAILED DESCRIPTION

The device for contact-free measurement of the temperature of the surface 1 of a workpiece 2, for example an aluminum strip or section, features a cylindrical housing 3 which is penetrated by a measuring pin 4 that is moveable along the central axis x.

Compressed air or the like is introduced via feed pipe 5 to a ring-shaped chamber 6 in housing 3; chamber 6 connects with the central bore 7 in the measuring pin 4 via transverse bore 8. The air passes through this bore 7 to the disc-shaped, thicker base 9 of the measuring pin 4 where it emerges from the pin 4 and, in the using position shown, impinges on the surface 1 of the workpiece 2. Because of the resulting distance of the base 9 of the pin 4 from the workpiece surface 1 the so-called hydrodynamic paradox (German hydrodynamisches Paradoxon) condition is reached that is the measuring pin base 9 is drawn towards the surface 1 as a result of a negative pressure created by the air flow conditions. This is also promoted by the ratio of the diameter $D_1$ of the axial bore 7 to the diameter $D_2$ of the measuring pin base 9.

The path of the air is indicated in the drawing by arrows.

As the housing 3 is stationary with respect to the workpiece 2, the measuring pin 4 reacts to such unevenness in the surface 1 in that it moves in the housing 3 in direction x almost without mechanical resistance. In order to avoid any limitation in its freedom of movement, the measuring pin base 9 can also slide in a blind hole 10 in the housing 3.

The ring-shaped chamber 6, closed at the top by a lid 11, accommodates heating elements 12 which are shown here schematically and are connected via wires 14 to a processing unit, such as a control facility 15. The latter is integrated with a registering unit 19 which receives, via wires 16, values measured by thermocouples 17, 18 situated in the axial bore 7 and in the measuring pin base 9 facing surface 1.

The device R can operate in two different modes which are explained as follows, where:

$T_1$ = temperature of thermocouple 18 in the base 9 measuring pin 4, $T_2$ = temperature of the thermocouple 17 in the central bore 7, $T_x$ = temperature of the workpiece 2 or substrate at the place of measurement.

1. The air being introduced is not pre-heated or else is brought to a temperature which is clearly below the temperature of the substrate to be measured. The temperature $T_1$ will then lie at a value between $T_x$ and the temperature $T_2$ of the inflowing air.

The temperature $T_x$ can be determined experimentally from the measured values $T_1$ and $T_2$ and the measuring facility calibrated accordingly, that is, workpieces with known surface temperatures, preferably in the range of between 100° to 500° C., are located in the measuring facility and the temperatures $T_1$ and $T_2$ are measured and recorded. It has been found for example that for $T_x=400°$ C. and $T_2=200°$ C. the temperature $T_1$ at the base 9 of the measuring pin 4 is 343° C. By varying $T_x$ and determining the temperature reading $T_1$, the relation betwen $T_1$ and $T_x$ can be determined for all temperatures, preferably in the range $500° C. \geq T_x \geq 100°$ C.

For other temperatures it is advantageous to raise or lower the temperature $T_2$ of the incoming air accordingly.

2. If, preferably using electronically controlled heating elements 12, the temperature $T_2$ of the inflowing air is adjusted such that $T_2=T_1$, then no heat transfer occurs from the workpiece 2 to the pin base 9 or vice versa. In this case, in accordance with the law of heat transfer, the temperature $T_x$ of the object being measured is the same as temperatures $T_1$ and $T_2$. This controlling of the temperature ensures that $T_2$ fluctuates about the value of $T_1$ i.e. is briefly above and then below temperature $T_1$. For this reason the reproducibility of the measuring facility is improved if the arithmetic mean $$(T_1+T_2)/2$$

is adjusted to the temperature of the object to be measured. Using the above equilibrium condition, in which no heat transfer occurs from the item to be measured to the base 9 of the measuring pin 4, two fundamental advantages are obtained:

(a) The distance between the pin base 9 and the surface 1 must only be sufficiently small, but not constant (a fluctuation from 0.02 to 0.06 mm has no effect on the measurement); the same holds for the thermal conductivity of the workpiece.

As no heat transfer occurs, the thermal conductivity of the air used likewise has no influence on the measured value.

(b) As no heat is transferred from the item being measured to the base of the measuring pin, there is no thermal effect acting on the workpiece. This is of decisive importance for accurate temperature measurement.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A device for the contact-free measurement of the temperature of a workpiece comprising a housing having a chamber about a central axis; a measuring pin movably mounted within said chamber along the central axis thereof, said measuring pin having a base piece on one end thereof adjacent to and spaced from said workpiece and a central bore for communicating compressed gas from a source to an outlet opening provided on said base piece for impinging said compressed gas on said workpiece; and temperature sensing means located in said central bore and on said base piece for measuring the temperature at said central bore and said base piece and registering the sensed temperatures in a control facility and determining from said sensed temperatures the temperature of the workpiece.

2. A device according to claim 1 wherein the central bore is connected via a transverse bore in the measuring pin to said chamber in said housing wherein a feed pipe for the compressed gas is connected to the chamber and heating elements connected by wires to the control facility are situated in said chamber.

3. A device according to claim 1 for measuring the shape of the workpiece.

4. A process for the measurement of the temperature on the surface of a workpiece wherein compressed gas fed to the surface of the workpiece creates a negative pressure between a measuring pin and the surface of the workpiece such that the measuring pin is maintained at a specific distance from the surface of the workpiece, comprises measuring a first temperature in a central bore provided in the measuring pin and a second temperature at the base of the measuring pin and determining from those said first and second measurements the temperature of the workpiece surface.

5. A process according to claim 4 wherein compressed gas is maintained at the temperature of the pin base which corresponds to the temperature on the surface of the workpiece.

6. A process according to claim 4 for measuring the shape of the workpiece.

* * * * *